United States Patent
Holst et al.

(10) Patent No.: US 10,544,892 B2
(45) Date of Patent: Jan. 28, 2020

(54) ASSEMBLY COMPRISING AN END-FITTING AND AN UNBONDED FLEXIBLE PIPE

(71) Applicant: National Oilwell Varco Denmark I/S, Brondby (DK)

(72) Inventors: Thorsten Holst, Taastrup (DK); Anders Straarup, Valby (DK); Tom Larsen, Roskilde (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 171 days.

(21) Appl. No.: 15/751,288

(22) PCT Filed: Aug. 5, 2016

(86) PCT No.: PCT/DK2016/050262
§ 371 (c)(1),
(2) Date: Feb. 8, 2018

(87) PCT Pub. No.: WO2017/025096
PCT Pub. Date: Feb. 16, 2017

(65) Prior Publication Data
US 2018/0231163 A1    Aug. 16, 2018

(30) Foreign Application Priority Data
Aug. 10, 2015   (DK) .................................. 2015 70513

(51) Int. Cl.
*F16L 33/01*    (2006.01)
*F16L 11/127*   (2006.01)
(Continued)

(52) U.S. Cl.
CPC .............  *F16L 33/01* (2013.01); *F16L 11/081* (2013.01); *F16L 11/127* (2013.01); *F16L 53/34* (2018.01)

(58) Field of Classification Search
CPC .. F16L 25/08; F16L 11/12; F16L 11/08; F16L 33/01; F16L 53/00
(Continued)

(56) References Cited

U.S. PATENT DOCUMENTS 2,883,513 A      4/1959  Schnabel
5,289,561 A *    2/1994  Costa Filho .......... F16L 11/127
                                                       392/478
(Continued)

FOREIGN PATENT DOCUMENTS

DE      1750392 A1    11/1970
EP       485220 A1     5/1992
(Continued)

OTHER PUBLICATIONS

Extended European Search Report for 16 83 4695.5 dated Mar. 14, 2019.
(Continued)

*Primary Examiner* — Patrick F Brinson
(74) *Attorney, Agent, or Firm* — Pearne & Gordon LLP

(57) ABSTRACT

The present invention relates to an assembly comprising an end-fitting and an unbonded flexible pipe having a length and a longitudinal axis, said flexible pipe comprising, from the inside and out, an internal armour layer, an internal pressure sheath, at least one external armour layer and an outer sheath, the first end of the unbonded flexible pipe being terminated in the end-fitting, and the end-fitting comprising means for connecting the internal armour layer to an external electrical power source. The means comprise connection points to the internal armour layer in the unbonded flexible pipe and connection points to the electrical power source wherein the connection points for the electrical power source are mounted in a housing adapted to an outer surface-part of the end-fitting.

13 Claims, 3 Drawing Sheets

(51) Int. Cl.
*F16L 11/08* (2006.01)
*F16L 53/34* (2018.01)

(58) Field of Classification Search
USPC .......... 138/134, 135, 109; 285/222.1–222.5, 285/255, 238, 242, 334.1
See application file for complete search history.

(56) References Cited

U.S. PATENT DOCUMENTS

| | | | |
|---|---|---|---|
| 5,428,706 A | 6/1995 | Lequeux | |
| 5,551,484 A | 9/1996 | Charboneau | |
| 6,273,142 B1 * | 8/2001 | Braad | F16L 11/083 138/109 |
| 6,360,781 B1 * | 3/2002 | Braad | F16L 25/08 138/109 |
| 6,412,825 B1 * | 7/2002 | Langkjaer | F16L 33/01 285/222.1 |
| 6,742,813 B1 * | 6/2004 | Glejbol | F16L 33/01 285/222.1 |
| 6,923,477 B2 * | 8/2005 | Buon | F16L 33/003 138/109 |
| 8,220,129 B2 * | 7/2012 | Eccleston | F16L 33/01 29/458 |
| 9,534,719 B2 * | 1/2017 | Eccleston | F16L 33/01 |
| 9,989,183 B2 * | 6/2018 | Glejbol | F16L 11/127 |
| 10,088,079 B2 * | 10/2018 | Moller Andersen | F16L 33/01 |
| 2009/0322077 A1 * | 12/2009 | Eccleston | F16L 33/01 285/337 |
| 2013/0192707 A1 * | 8/2013 | Graham | E21B 47/0006 138/109 |
| 2017/0299092 A1 * | 10/2017 | Larsen | F16L 25/01 |

FOREIGN PATENT DOCUMENTS

| | | |
|---|---|---|
| GB | 2476515 A | 6/2011 |
| WO | 2012/059729 A1 | 5/2012 |
| WO | 2014/177152 A1 | 11/2014 |
| WO | 2015/014365 A1 | 2/2015 |
| WO | 2015/070871 A1 | 5/2015 |

OTHER PUBLICATIONS

"Recommended Practice for Flexible Pipe", ANSI/API 17 B, fourth Edition, Jul. 2008.
"Specification for Unbonded Flexible Pipe", ANSI/API 17J, Third edition, Jul. 2008.
International Search Report for International Application No. PCT/DK2016/050262, dated Oct. 31, 2016.
Danish Search Report for Application No. PA 2015 70513, dated Mar. 16, 2016.

* cited by examiner

ASSEMBLY COMPRISING AN END-FITTING AND AN UNBONDED FLEXIBLE PIPE The present invention relates to an assembly comprising an end-fitting and an unbonded flexible pipe having a length and a longitudinal axis, said flexible pipe comprising, from the inside and out, an internal armour layer, an internal pressure sheath, at least one external armour layer and an outer sheath, the first end of the unbonded flexible pipe being terminated in the end-fitting, and the end-fitting comprises means for connecting the internal armour layer to an external electric power source.

TECHNICAL FIELD

Unbonded flexible pipes are frequently used as flexible risers or flexible flowlines for the transport of fluid hydrocarbons such as oil and gas.

Moreover, unbonded flexible pipes are often used e.g. as riser pipes or flowlines in the production of oil or other subsea applications.

The unbonded flexible pipes are constructed from a number of non-bonded layers, such as helically laid steel and polymeric layers formed around a central bore for transporting fluids. A typical unbonded flexible pipe comprises, from the inside and outwards, an inner armouring layer known as the carcass, an internal pressure sheath surrounded by one or more armouring layers, such as pressure armouring and tensile armouring, and an outer sheath. Thus, the internal pressure sheath forms a bore in which the fluid to be transported is conveyed, i.e. the inner surface of the internal pressure sheath facing the carcass forms the bore.

The armouring layers comprise or consist of multiple elongated armouring elements that are not bonded to each other directly or indirectly via other layers along the pipe. Thereby, the pipe becomes bendable and sufficiently flexible to roll up for transportation. The armouring elements are very often manufactured from metallic and electrically conductive material.

Flexible unbonded pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. As mentioned such pipes usually comprise an innermost sealing sheath—often referred to as an internal pressure sheath, which forms a barrier against the outflow of the fluid which is conveyed in the bore of the pipe, and one or usually a plurality of armouring layers. Normally the pipe further comprises an outer protection layer, often referred to as the outer sheath, which provides mechanical protection of the armour layers. The outer protection layer may be a sealing layer sealing against ingress of sea water. In certain unbonded flexible pipes one or more intermediate sealing layers are arranged between armour layers.

In general flexible unbonded pipes are expected to have a lifetime of 20 years or more in operation.

The meaning of the term "unbonded" in this text is that at least two of the layers including the armouring layers and polymer layers are not bonded to each other. In practice the known pipe normally comprises at least two armouring layers located outside the internal pressure sheath and optionally an armour structure located inside the internal pressure sheath, which inner armour structure normally is referred to as the carcass.

An unbonded flexible pipe is terminated by an end-fitting in which the individual layers of the unbonded flexible pipe are fixed. The end-fitting comprises a flange or similar means which makes it possible to connect the end-fitting to other connectors, e.g. on a production platform or a well.

In recent years considerable research efforts have been put into flexible unbonded pipes equipped with heating systems, such as electric heating. The electric heating system may utilize the metallic armour layers in the unbonded flexible pipe. Such pipes are terminated in both ends using end-fittings designed to withstand the mechanical and thermal loads put on the pipe. Successful systems utilizing electric heating of the unbonded flexible pipe require that the end-fitting is equipped with means for electrical connection, hence, the end-fitting should be adapted for operating with electricity, such as comprising electrical wiring.

DISCLOSURE OF INVENTION

An object of the present invention is to provide an improved assembly comprising an end-fitting and an unbonded flexible pipe allowing the heating system in the unbonded flexible pipe to receive electric power from an external power source.

The present invention relates to an assembly comprising an end-fitting and an unbonded flexible pipe. The unbonded flexible pipe has a length and a longitudinal axis and a first and a second end. The flexible pipe comprises
from the inside and out;
an internal armour layer,
an internal pressure sheath,
at least one external armour layer and an outer sheath, and the first end of the unbonded flexible pipe being terminated in the end-fitting in a pipe-end. Opposite to the pipe-end the end-fitting has a flange-end comprising a flange for connection to a connector, and the end-fitting comprises an annular channel next to the flange in the direction of the pipe-end. The end-fitting further comprises means for connecting the internal armour layer to an external electrical power source, the means for connecting comprises connection points to the internal armour layer in the unbonded flexible pipe and connection points to the electrical power source wherein the connection points for the electrical power source are mounted in a housing adapted to an outer surface-part in the annular channel of the end-fitting.

End-fittings are well-known in the technical field of unbonded flexible pipes, in which it is also well-known how to terminate an unbonded flexible pipe in an end-fitting.

At one end the end-fitting comprise a flange adapted to connect the end-fitting to a connector, which may e.g. be a connection to a floating unit or another end-fitting. Next to the flange the end-fitting comprises an annular channel going around the circumference of the end-fitting providing an indentation in the outer surface-part of the end-fitting. In this context the end-fitting has a length which extends from the flange-end to the pipe-end.

The phrase "outer surface-part of the end-fitting" should be understood as comprising any part of the surface of the end-fitting which may come into contact with the surrounding environment.

The unbonded flexible pipe comprises an internal armour layer inside the internal pressure sheath. The internal armour layer may be referred to as the carcass. The unbonded flexible pipe also comprises at least one external armour layer outside the internal pressure sheath.

The terms "inside" and "outside" a layer, such as e.g. the internal pressure sheath, of the pipe is used to designate the relative distance to the axis of the pipe, such that by "inside a layer" is meant the area encircled by the layer i.e. with a shorter axial distance than the layer and by "outside a layer" is meant the area not encircled by the layer and not contained by the layer, i.e. with a longer distance to the axis of the pipe than the layer. The longitudinal axis of the pipe also defines the center axis of the pipe, i.e. "longitudinal axis" and "center axis" are used interchangeably.

Thus, the unbonded flexible pipe comprises a carcass inside the internal pressure sheath. Outside the internal pressure sheath the unbonded flexible pipe comprises at least one external armour layer. This at least one external armour layer may comprise one or two pressure armour layers and/or one or two tensile armour layers. The pressure armour layer and the tensile armour layer may be manufactured from an electrically conductive material.

The carcass in an unbonded flexible pipe is preferably produced by winding from an elongate member such as a strip. The elongate member is made to form a tube, and the winding degree is typically from between 85° to 89.8°.

When the unbonded flexible pipe comprises one or more pressure armour layers, such layers are typically made from elongate members wound with an angle of approximately 65° to about 88° in respect of the center axis. Frequently an unbonded flexible pipe comprises two pressure armour layers which may be wound either in the same or in opposite directions in relative to the center axis.

The unbonded flexible pipe may also comprise one or more tensile armour layers. Very often an unbonded flexible pipe comprises two tensile armour layers which are wound in opposite directions in respect of the center axis. The winding angle relative to the center axis is approximately in the range of 25° to 55°.

According to the invention the end-fitting comprises means for connecting the internal armour layer or carcass to an external electrical power source. These means comprise connection points to the internal armour layer in the unbonded flexible pipe and connection points to the electrical power source. The connection points will typically be electrical contacts. Electrical contact between the connection points is established by means of electrical wiring. The electrical wiring may e.g. comprise copper or aluminium wire or a rod of copper or aluminium.

Moreover, in an embodiment, the connection points to the internal armour layer in the unbonded flexible pipe and the connection points to the electrical power source are connected by an electrical conductor electrically insulated from the end-fitting. The electrical conductor may be an electrically conductive wire or rod with insulating material on the outer surface. The insulating material may e.g. be a polymer material such as polyethylene, polyvinyl chloride, silicone, or modified ethylene tetrafluoroethylene or a combination thereof.

According to the invention the connection points for the electrical power source are mounted in a housing adapted to the channel in the outer surface-part of the end-fitting. The housing encapsulates the connection points for the electrical power source and serves to ensure that moisture, water, oil and gas are kept away from the connection points. The housing is adapted to receive wiring from the electrical power source while at the same time being adapted to an outer surface-part of the end-fitting. Thus, the housing is mounted on the exterior surface of the end-fitting and protects the connection points to the external power source. The housing may be a box having access parts for receiving electrical wires and parts which allow connection to the end-fitting.

In an embodiment the end-fitting assembly comprises means for connecting the at least one external armour layer to the electrical power source. The means comprises connection points to the external armour layer in the unbonded flexible pipe which are connected to connection points for the electrical power source, preferable by means of electrical wiring.

The housing is mounted in the annular channel of the end-fitting next to the flange to connect to other parts, such as a production platform. Thus the housing may be placed in a relatively protected position in the channel of the end-fitting.

In an embodiment of the assembly the housing and the electrical connections are ATEX certified. When the housing and the electrical connections are ATEX certified, the risk of explosion is minimized (ATEX: ATmosphére EXplosive) and the parts meet the requirements in Directive 94/9/EC-ATEX Guidelines, from the European Community. The housing is preferably manufactured by use of an electrically insulating material, such as e.g. polyethylene, polyurethane, polyvinyl chloride, silicone, or ethylene tetrafluoroethylene. However, the housing may also be manufactured from a metallic material, optionally with an insulating coating. The housing may be adapted for attachment to the end-fitting by means of bolts, screws, snap-locks, or optionally by gluing or welding.

In an embodiment the internal armour layer is wound from an elongate metallic member, and preferably the elongate metallic member has a specific resistance of about $10^{-6}$ $\Omega \cdot m$ or less. Preferably the elongate member is wound up to form a tube, and the winding degree is typically from between 85° to 89.8°.

In an embodiment the at least one external armour layer comprises a pressure armour. Preferably, the unbonded flexible pipe comprises one or two pressure armour layers.

In an embodiment, the at least one external armour layer comprises a tensile armour. Preferably the unbonded flexible pipe comprises one, two or more tensile armour layers.

Preferably, the at least one external armour layer is wound from an elongate metallic member having a specific resistance of about $10^{-6}$ $\Omega \cdot m$ or less.

In an embodiment, the unbonded flexible pipe comprises one or more insulating layers. The layers may be both thermally and electrically insulating, and in this respect serve to control the heat in the pipe and which parts of the pipe are exposed to electricity. Preferably the one or more insulating layers are terminated in the end-fitting.

In an embodiment the second end of the unbonded flexible pipe is terminated in a second end-fitting. Thus, at least the first end of the unbonded flexible pipe is terminated in the first end-fitting having connection points to connect with an external power source. However, the second end of the unbonded flexible pipe is preferably terminated in a second end-fitting. This second end-fitting preferably comprises means for establishing electrical contact between the internal armour layer and at least one external armour layer. Thus, an electrical circuit may be established between the external power source, the internal armour layer and the external armour layer via the first and the second end-fitting.

In an embodiment the surface of the end-fitting is coated with an insulating material, in particular an electrically insulating material such as a polymer material having a high electrical resistance, including epoxy, polyurethane, polytetrafluoroethylene, fluorinated ethylene propylene, enamel coatings and various fibre-reinforced coatings.

In an embodiment of the assembly the outer surface of the end-fitting is provided with a protective sleeve. The outer sleeve may be made from metallic and/or polymer material, and serve to protect the end-fitting during transport. Thus, when the assembly has been transported to the deployment site, the protective sleeve may be removed. The protective sleeve may optionally be re-used for other end-fittings.

DETAILED DESCRIPTION OF THE INVENTION

The invention will now be described in further details with reference to embodiments shown in the drawing in which.

The figures are not accurate in every detail but only sketches intended to show the principles of the invention. Details which are not a part of the invention may have been omitted. In the figures the same reference numbers are used for the same parts.

Figure 1:
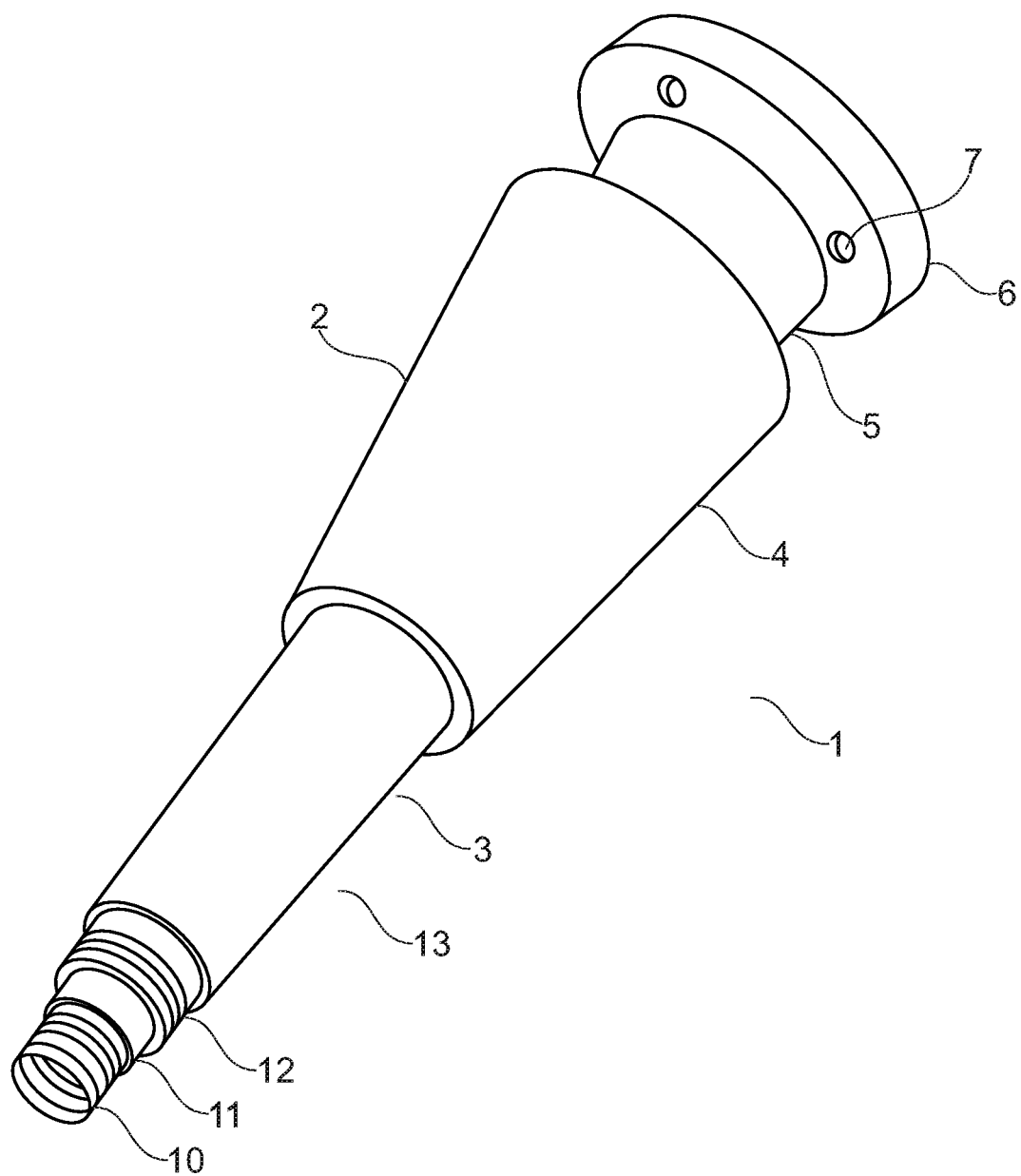
FIG. 1 shows an assembly of an end-fitting and a pipe.

FIG. 1 illustrates an assembly 1 comprising an end-fitting 2 and an unbonded flexible pipe 3.

The end-fitting 2 comprises a body part 4, a channel 5 and a flange 6 for connection to a connector or another end-fitting. The flange 6 comprises holes 7 for bolts which may be used for the connection.

The unbonded flexible pipe 3 comprises, from the inside an out, a carcass 10, an internal pressure sheath 11, a tensile armour 12 and an outer sheath 13.

Figure 2:
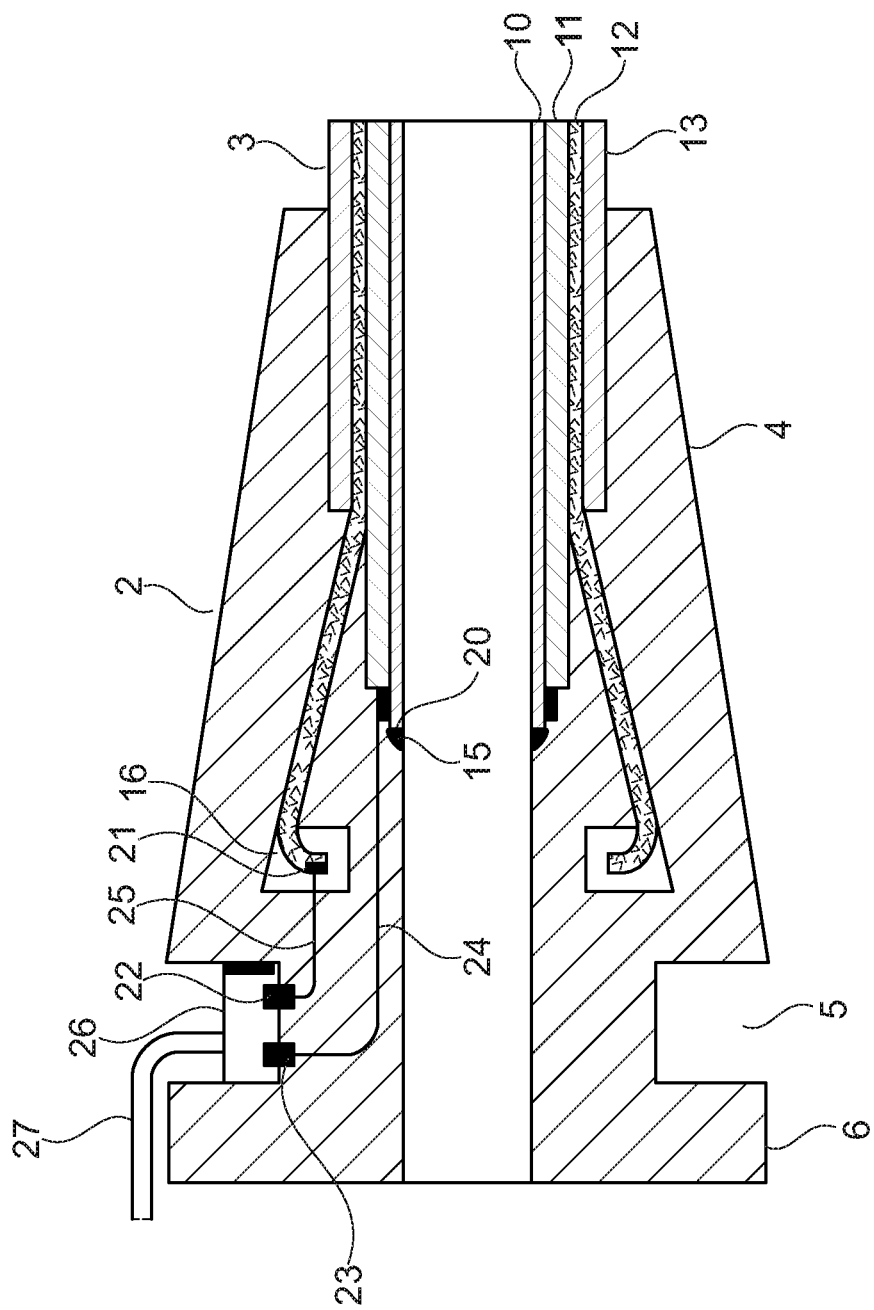
FIG. 2 shows a cross section of an assembly according to the invention.
Figure 3:
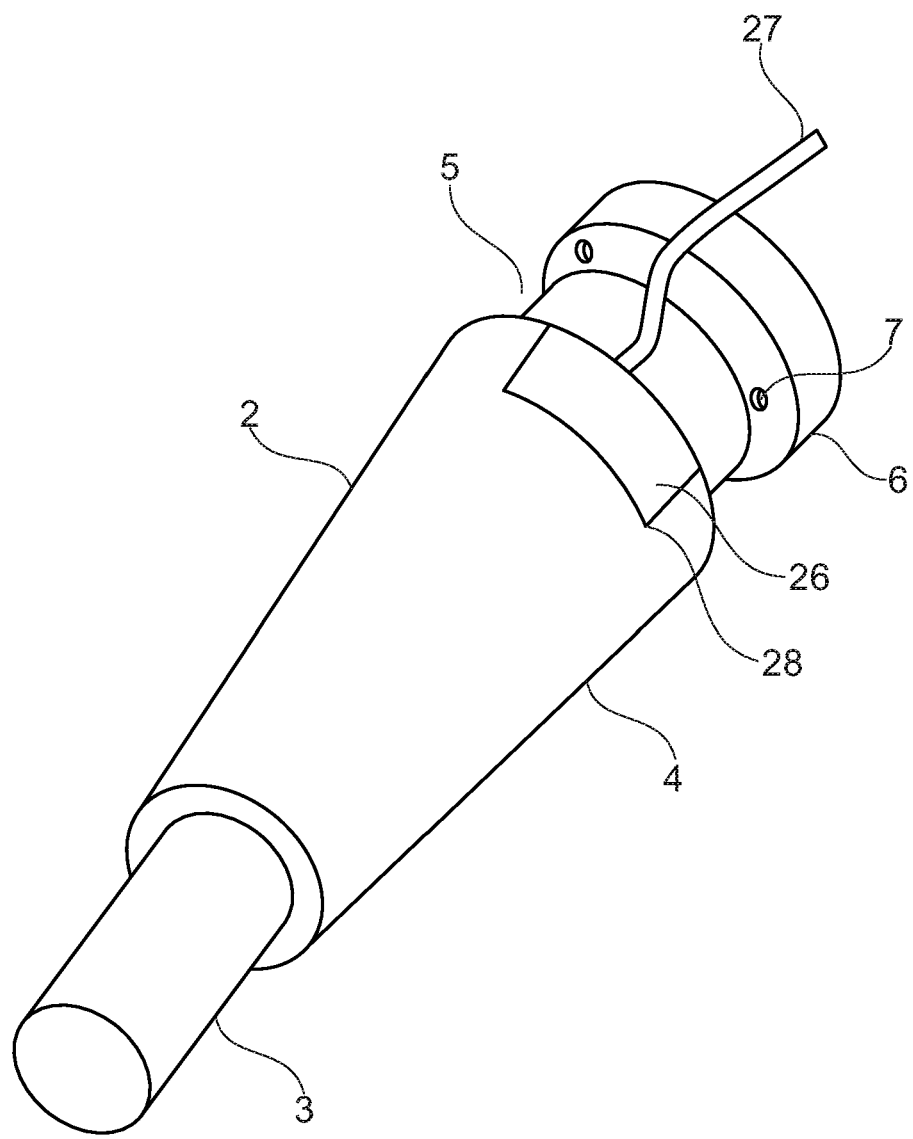
FIG. 3 shows an assembly of an end-fitting and a pipe according to the invention.

FIG. 2 shows a cross section of an assembly 1 according to the present invention. The assembly 1 comprises an end-fitting 2 and an unbonded flexible pipe 3 which is terminated in the end-fitting 2.

The carcass layer 10 is terminated in the body 4 of the end-fitting at the carcass ring 15. The internal pressure sheath 11 is also terminated in the end-fitting 2 and fixed by pressure means (not shown). The tensile armour 12 is terminated in a cavity 16 in the end-fitting 2. The tensile armour 12 is fixed by an epoxy resin filled into the cavity 16. Finally, the outer sheath 13 is terminated in the body 4 of the end-fitting. The outer sheath 13 is fixed by pressure means (not shown).

The carcass 10 and the tensile armour 12 are equipped with electrical connection points 20 and 21 which are connected to the connection points 22 and 23 located in the annular channel 5 of the end-fitting 2 via the wiring 24 and 25. The connection points 20, 21 and 22, 23 and the wiring 24 and 25 are integrated in the end-fitting 2.

The connection points 22 and 23 are protected by a housing 26 which fulfill the requirements in Directive 94/9/EC-ATEX Guidelines, from the European Community.

Via the cable 27 the connections points are connected to an external electrical power source, whereby it is possible to establish an electrical circuit between the external electrical power source and the carcass 10 and the tensile armour 12.

Figure shows 3 shows an embodiment in which the housing 26 protecting the connection points 22 and 23 is located in a recess 28 in the body 4 of the end-fitting 2. The cable 27 is lead through the upper part of the housing 26 and at least partly sheltered by the channel 5 of the end-fitting 2. Alternatively the cable 27 may be lead through holes 7 of the flange 6.

In an alternative embodiment of the invention only the carcass is connected to the cable and the end-fitting is used as return lead. This is possible since the tensile armour according to this embodiment has electrical contact with the end-fitting. However, the carcass should be carefully insulated from the electrically conductive parts of the end-fitting.

Consequently the present invention provides an assembly of an end-fitting and an unbonded flexible pipe in which a connector is integrated in the end-fitting and allows electrical access from the outside directly to the carcass of the pipe and optionally and other electrically conductive armour layer.

What is claimed is:

1. An assembly comprising an end-fitting and an unbonded flexible pipe having a length and a longitudinal axis and a first and a second end, said flexible pipe comprising, from the inside and out;
   an internal armour layer,
   an internal pressure sheath,
   at least one external armour layer and an outer sheath, the first end of the unbonded flexible pipe being terminated in the end-fitting in a pipe-end, said end-fitting opposite to the pipe-end has a flange-end comprising a flange for connection to a connector, the end-fitting comprises an annular channel next to the flange in the direction of the pipe-end, said end-fitting further comprises means for connecting the internal armour layer to an external electrical power source,
   said means comprising connection points to the internal armour layer in the unbonded flexible pipe and connection points to the electrical power source wherein the connection points for the electrical power source are mounted in a housing adapted to an outer surface-part in the annular channel of the end-fitting.

2. The assembly according to claim 1, wherein the connection points to the internal armour layer in the unbonded flexible pipe and the connection points to the electrical power source are connected by an electrical conductor electrically insulated from the end-fitting.

3. The assembly according to claim 1, wherein the end-fitting comprises means for connecting the at least one external armour layer to the electrical power source, said means comprising connection points to the external armour layer in the unbonded flexible pipe.

4. The assembly according to claim 1, wherein the housing is ATEX certified.

5. The assembly according to claim 1, wherein the internal armour layer is wound from an elongate metallic member.

6. The assembly according to claim 1, wherein the at least one external armour layer comprises a pressure armour.

7. The assembly according to claim 1, wherein the at least one external armour layer comprises a tensile armour.

8. The assembly according to claim 1, wherein the at least one external armour layer is wound from an elongate metallic member.

9. The assembly according to claim 1, wherein the unbonded flexible pipe comprises one or more insulating layers, preferably said one or more insulating layers being terminated in the end-fitting.

10. The assembly according to claim 1, wherein the second end of the unbonded flexible pipe is terminated in an end-fitting.

11. The assembly according to claim 1, wherein the second end of the unbonded flexible pipe is terminated in a second end-fitting, said second end-fitting comprises means for electrically connecting the internal armour layer with at least one external armour layer.

12. The assembly according to claim 1, wherein the surface of the end-fitting is coated with an insulating material.

13. The assembly according to claim 1, wherein the outer surface of the end-fitting is provided with a protective sleeve.

* * * * *